B. A. BEHREND.
DYNAMO ELECTRIC MACHINE.
APPLICATION FILED NOV. 27, 1905.
909,136.
Patented Jan. 12, 1909.
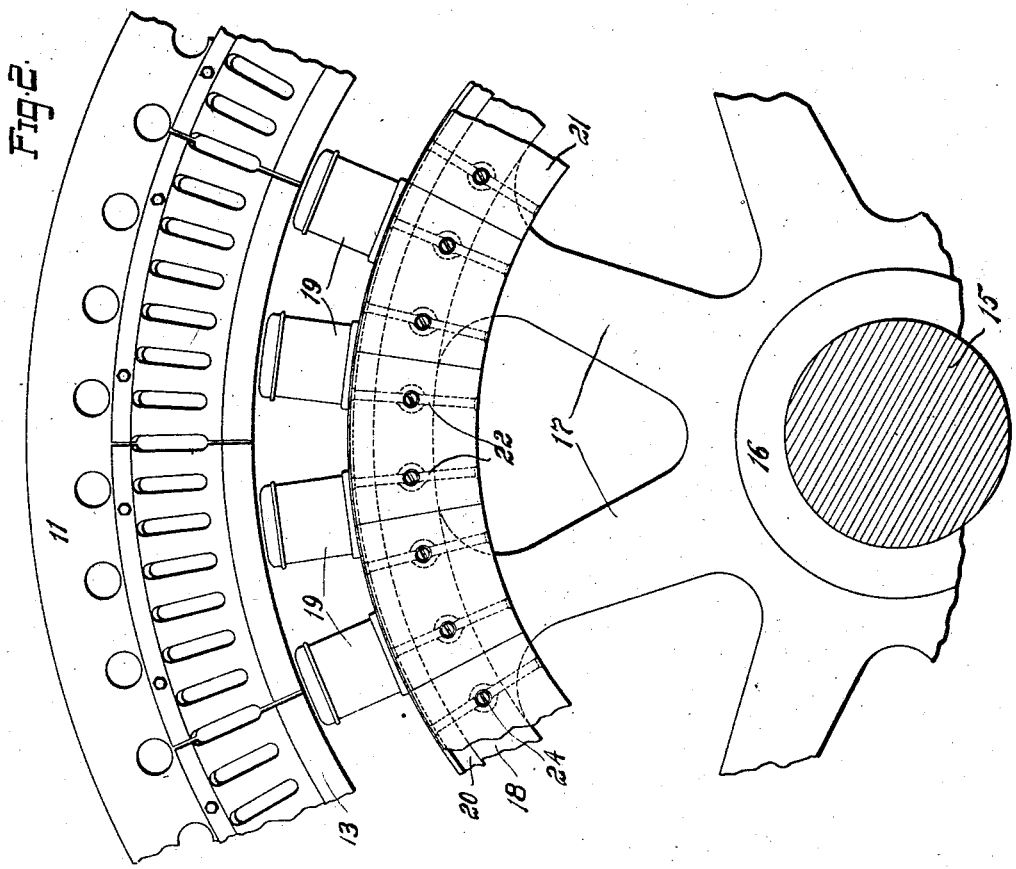
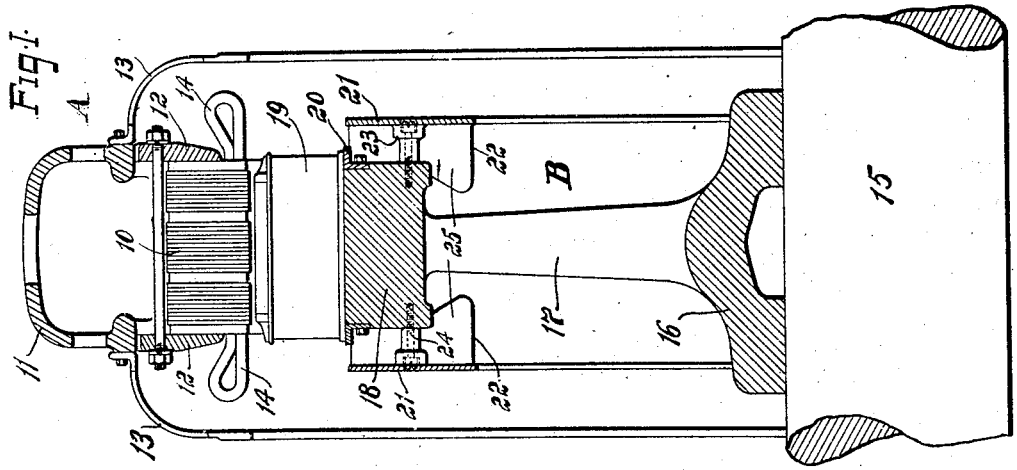
WITNESSES:
George J. Schwartz
Fred J. Kinsey.
INVENTOR:
Bernard A. Behrend.
By
Chas. E. Lord
ATTORNEY.

UNITED STATES PATENT OFFICE.

BERNARD ARTHUR BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 909,136.  Specification of Letters Patent.  Patented Jan. 12, 1909.

Application filed November 27, 1905. Serial No. 289,219.

*To all whom it may concern:*

Be it known that I, BERNARD ARTHUR BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to dynamo electric machines and particularly to the means for securing improved ventilating and cooling effect in rotating field alternators.

In alternators of the rotating field type the seat of the greatest amount of heating is in the stationary armature. The field magnets are also heated but generally not to a very great extent. In the usual construction of such machines no special provision is made for creating a circulation of air through and around the core and coils of the stator, the fan-like action of the field magnets being relied on for this purpose. In machines of large size and output, however, a sufficient cooling effect can not always be obtained in this manner, particularly if the machines are operated for long periods under heavy loads.

One of the objects of my invention is to provide ventilating means whereby an ample circulation of air is obtained through all parts of a machine for preventing an excessive rise of temperature under any conditions of operation.

A further object is to provide on the rotating field member ventilating means which will be very effective, easy to apply or remove from the field member, and which will not detract from the appearance of the machine.

In carrying out my invention, I provide fan blades or blowers on each side of the rim of the spider of the rotary field element. I prefer to construct the fans or blowers in the form of segments or sections, each consisting of a plate having ribs which act as fan blades. The segments or sections are bolted to the spider with the ribs or blades in engagement with the sides and preferably also the inner surface of the rim, and the segments are arranged end-to-end so that the plates form continuous bands or shields which conceal the blades and direct the air outward. The bolts which attach the segments to the spider preferably pass through the ribs so as not to interfere with the circulation of air.

For a better understanding of my invention reference is had to the accompanying drawing in which—

Figure 1 is a longitudinal section through one half of an alternating current dynamo-electric machine; and Fig. 2 is an elevation of portions of the machine.

A stationary element of an alternating current machine embodying my invention is shown at A. A laminated armature core 10 is mounted on a frame 11 and is clamped between end-plates 12. End-bells or end-shields 13 are provided at each side of the stationary frame 11, each end-bell or shield preferably consisting of a large number of sections. The armature winding is mounted in the core slots in the customary manner and is provided with end-turns 14 which extend beyond each side of the armature core.

The rotating element is shown at B. Mounted on the shaft 15, is a spider consisting of a hub 16, arms 17, and rim 18. Mounted on the rim 18, are the field-magnet poles 19, the ends of the coils of which are supported on angle-iron sections 20, secured on each side of the rim 18. In order that a large circulation of air will be obtained by the rotation of the field magnet, I provide at each side of the rim of the field spider fans or blowers in the form of fan-segments. Each segment consists of an outer plate 21, and a plurality (in this case two) of ribs 22 which form the fan-blades. Each rib is provided with an enlarged portion 23, which is drilled to receive a bolt 24, by means of which the segment is held to the rim. As is shown, the ribs or fan-blades engage closely the sides of the rim and fit snugly in the angle of the angle-iron sections 20, and each rib or fan-blade has an enlarged inner extension 25 which engages the inner side of the rim. Thus by means of these last named extensions 25 which engage the inner side of the rim, and the portions which engage the inner sides of the angle-iron sections 20, displacement of the segments by centrifugal action is prevented. The segments are arranged side by side, with the ends of the outer plates of adjacent segments in engagement with one another. The outer plates 21 thus form on the sides of the spider rim complete rings or bands which protect the fan-blades and tend to direct the air-currents outward against the armature core and coils.

When the machine is in operation a large volume of air is forced outward by the fans, cooling the field magnets and the core and coils of the stator. It is seen that each of the fan-segments can be removed in case it is desired to repair any part of the machine or in case of injury to the segment itself. The segments are securely fastened to the rim and cannot be displaced by centrifugal action at the highest speeds.

I aim in my claims to cover all modifications which do not depart from the spirit and scope of my invention.

What I claim as new and desire to secure by Letters Patent is:—

1. In a dynamo-electric machine, a stationary armature, a revolving field structure having projecting poles, removable fan segments secured to the side of said field structure, each fan segment consisting of an outer plate and inwardly projecting blades engaging the field structure and arranged radially relative to the axis of rotation, said blades having enlarged portions formed with openings therethrough, and bolts passing through said openings and into the field structure to fasten the segment in place.

2. In a dynamo-electric machine, a rotary field member comprising a spider having a rim, field poles secured to said rim, rings L-shaped in cross section secured to said rim and having flanges extending radially inward along the sides of the latter and laterally extending flanges, and a plurality of separately removable fan segments secured to each side of said field member, each segment consisting of an outer plate and blades projecting toward and engaging the side of the rim and one of said laterally extending flanges, said outer plates being arranged end to end and forming rings or bands which conceal the blades and guide the air outward.

3. In a dynamo-electric machine, a rotary field structure having projecting field poles, and fan segments secured to said field structure, each segment comprising an outer plate and inwardly projecting blades which engage the sides of the field structure, said plates being arranged end-to-end so as to form continuous rings or bands which conceal the blades and guide the air outward.

4. In a dynamo-electric machine, a stationary armature, a rotary field member, said member comprising a spider having a rim, field-poles dove-tailed to said rim, angle-iron rings at each side of the rim and near the outer surface for supporting the ends of the field coils and for retaining poles in position, and a plurality of fan-blades on each side of the rim, said fan-blades engaging the inner side of the rim and the extensions of the angle-iron rings.

5. In a dynamo-electric machine, a stationary armature, a rotary field member, said field member comprising a spider having a rim, field-poles mounted on the outer surface of the rim, angle-irons at each side of the rim and near its outer surface, a plurality of radial fan-blades at each side of the rim, said blades engaging the extensions of the angle-irons and the inner side of the rim, said blades having lugs, and holding bolts passing through said lugs into the sides of the rim.

6. In a dynamo-electric machine, a rotary field member comprising a spider having a rim provided with projecting field poles, fan segments secured to the rim, each segment consisting of an outer plate and inwardly projecting blades which engage the side and inner face of the rim, said plates being arranged end-to-end so as to form a continuous ring or band which conceals the blades and directs the air outward.

7. In a dynamo-electric machine, a rotating field member comprising a spider having a rim, field poles secured to the rim, rings L-shaped in cross section secured to the sides of the rim and having outwardly projecting flanges, and fan segments secured to the field structure, each segment consisting of an outer plate and inwardly projecting blades which engage the rim and the projecting flange of the corresponding L-shaped ring.

8. In a dynamo-electric machine, a rotating field member comprising a spider having a rim provided with projecting field poles, rings L-shaped in cross sections secured to the sides of the rim and having outwardly projecting flanges which engage the ends of the field coils, and fan segments secured to the rim, said segments consisting of outer plates and inwardly projecting blades which engage the sides and inner surface of and the flanges of the L-shaped rings.

9. In a dynamo-electric machine, a stationary armature comprising a core, armature coils having end-turns, a rotary field member comprising a spider having an outer circular rim, field-poles mounted on the rim, fan-segments mounted on each side of the rim, each segment consisting of an outer plate and a plurality of radial fan-blades which engage the sides and inner surface of the rim, said plates being arranged end to end forming a continuous ring at each side of the rim, and means comprising bolts passing through the blades for fastening each segment separately to the rim.

In testimony whereof I affix my signature, in the presence of two witnesses.

BERNARD ARTHUR BEHREND.

Witnesses:
LAURA E. WELCH,
ARTHUR F. KWIS.

It is hereby certified that in Letters Patent No. 909,136, granted January 12, 1909, upon the application of Bernard Arthur Behrend, of Norwood, Ohio, for an improvement in "Dynamo-Electric Machines," errors appear in the printed specification requiring correction, as follows: In line 108, page 2, the word "which" should be stricken out, and in line 109, same page, the words "surface of" should be stricken out and the words *face of the rim* inserted instead; and that the said Letters Patent should be read with these corrections therein that the same may conform to the record of the case in the Patent Office.

Signed and sealed this 9th day of February, A. D., 1909.

[SEAL.]
C. C. BILLINGS,
*Acting Commissioner of Patents.*